United States Patent [19]

Brandyberry et al.

[11] Patent Number: 4,566,261

[45] Date of Patent: Jan. 28, 1986

[54] METALLIC CABLE AND APPARATUS FOR MANUFACTURING THE SAME

[75] Inventors: Dennis R. Brandyberry, Canton; Grover W. Rye, Cuyahoga Falls, both of Ohio

[73] Assignee: The Goodyear Tire & Rubber Company, Akron, Ohio

[21] Appl. No.: 650,483

[22] Filed: Sep. 14, 1984

[51] Int. Cl.[4] .......................... D02G 3/48; D07B 1/00; D07B 3/00

[52] U.S. Cl. .......................................... 57/212; 57/9; 57/58.63; 57/200; 57/311

[58] Field of Search .......................... 57/3, 6, 9, 12, 13, 57/15, 200, 210, 211, 212, 213, 215, 218, 230, 236, 235, 237, 311, 902, 58.3, 58.63

[56] References Cited

U.S. PATENT DOCUMENTS

| | | | |
|---|---|---|---|
| 3,283,492 | 11/1966 | Little | 57/213 |
| 3,509,710 | 5/1970 | Redmond | 57/902 X |
| 3,791,127 | 2/1974 | Wesson | 57/58.63 X |
| 4,022,009 | 5/1977 | Assendelft | 57/212 |
| 4,030,248 | 6/1977 | Assendelft | 57/212 X |
| 4,385,486 | 5/1983 | Iwata et al. | 57/9 X |
| 4,464,892 | 8/1984 | Kleijwegt | 57/212 |
| 4,498,281 | 2/1985 | Wraight | 57/58.63 X |
| 4,516,395 | 5/1985 | Palmer et al. | 57/902 X |

*Primary Examiner*—Donald Watkins
*Attorney, Agent, or Firm*—L. R. Drayer

[57] ABSTRACT

A metallic cable (10) suitable for reinforcing elastomeric articles comprises two or more substantially identical, helically disposed filaments (11, 12, 13) nested together and twisted together, such that the cable has a lay length (L) that is at least two times greater than the pitch length (P) of the filaments. The cable is manufactured by drawing metallic filaments from a bobbin means (31, 32, 33) and then guiding them through a means for deforming (34) that shapes the filaments into helixes. The filaments are positioned beside and against each other such that each filament is in contact with at least one other filament. After a sunken rotating pulley (37) guides the filaments through the hollow bearing (23) of a first flyer (21), first and second rotating flyers (21, 22) twist the helically disposed filaments together to form a cable.

10 Claims, 7 Drawing Figures

10
11
12
13
L
P
2
3
4
5
6

METALLIC CABLE AND APPARATUS FOR MANUFACTURING THE SAME

BACKGROUND OF THE INVENTION

This invention relates generally to metallic cables suitable for reinforcing elastomeric articles, and more specifically to a cable structure and an apparatus and method for manufacturing a cable with this new structure.

One of the problems that may be encountered in elastomeric articles that are reinforced with metallic cables is the propogation of corrosion along the length of the cable in the event that the article is cut or torn so that the cable is exposed. One approach to solving the problem of corrosion propogation has been to make the cable very compact, so that there are no interstices between the filaments and strands comprising the cable, therefore leaving no natural pathway along which corrosion may travel. A second approach has been to make the cable with a very open construction, such that the elastomeric material in which the cable is embedded can penetrate the cable and substantially surround each individual filament. The present invention is concerned with the latter approach.

There has already been disclosed in U.S. Pat. Nos. 3,700,012 and 3,763,683 a method and apparatus for providing a cable of helical wire filaments that are nested in bundles and encapsulated within an elastomeric material to provide a reinforced fabric. The wire filaments are not twisted about one another, and no wrapping filament holds the helical filaments together, so the cable must be immediately encapsulated in the elastomeric material as a part of the same manufacturing process. The inability to store the cable itself on spools means each production line must comprise a cable forming apparatus in addition to an encapsulating apparatus, such as a calender, which is very costly and may require inordinately long set-up time between production runs.

A solution to the problem of providing a non-compact metallic cable that may be stored on spools between the cable forming and encapsulating operations is provided by the present invention.

There is provided in accordance with an aspect of the present invention a metallic cable suitable for reinforcing an elastomeric article comprising two or more substantially identical helical shaped metallic filaments positioned beside and against one other such that each filament is in contact with at least one other filament. The helixes formed by said filaments have a pitch length, and the filaments are twisted together such that the cable has a lay length that is at least two and one-half times greater than said pitch length.

BRIEF DESCRIPTION OF THE DRAWING

The invention will be better understood by referring to the figures of the drawing, wherein.

DETAILED DESCRIPTION OF THE INVENTION

Figures 1, 2, 3, 4, 5, 6:
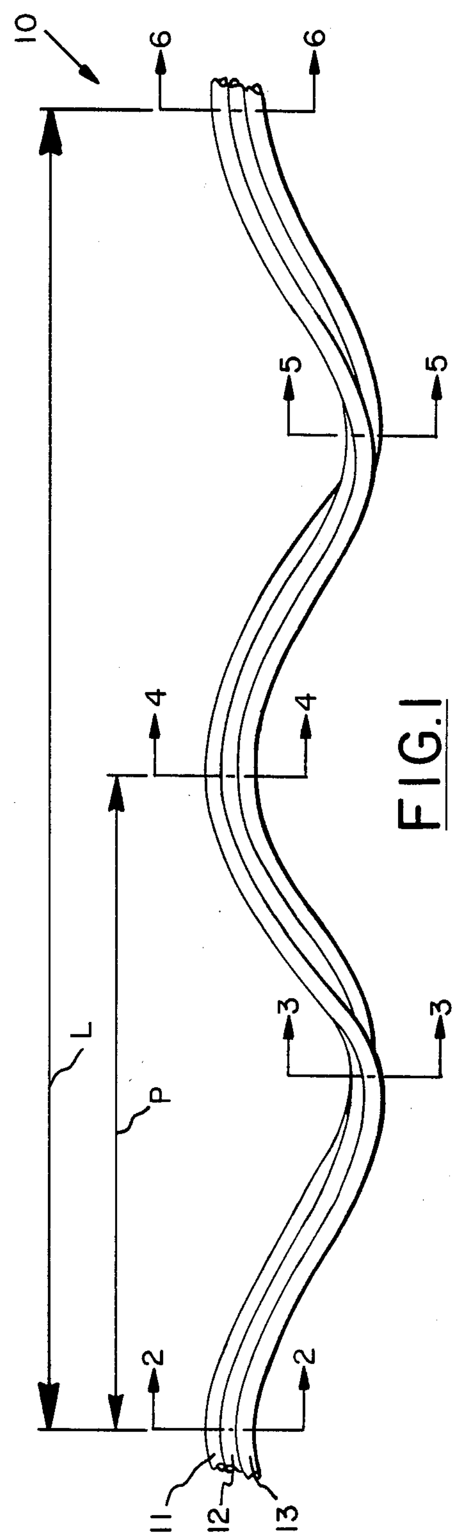
FIG. 1 is a side elevational view of a cable made in accordance with the invention.
FIGS. 2 to 6 are cross-sectional views taken along lines 2—2 to 6—6, respectively, of FIG. 1.

Referring first to FIG. 1, there is shown a metallic cable 10 suitable for reinforcing elastomeric articles, such as tires, belts and hoses. The metallic cable 10 comprises three substantially identical helically shaped filaments 11,12,13 positioned beside and against each other such that each filament is in contact with at least one other filament. As used herein, a "filament" refers to an individual metallic wire, and a "cable" refers to a group of filaments combined together to form a structure. It is preferred that the individual filaments have the same diameter in the range of between 0.20 mm and 0.30 mm. Most preferably, the filaments each have a diameter of 0.25 mm. However, it is understood that filaments having diameters outside of the preferred range may be used to manufacture a cable according to the present invention.

The helixes formed by each of the substantially identical filaments 11,12,13 have a "pitch length" P which is the axial distance required for a helically disposed filament to make one 360 degree revolution. For filaments having diameters in the preferred range, the preferred pitch length of the helixes is between 10 mm and 18 mm. It is understood that while the cable illustrated in FIG. 1 comprises three filaments, a cable according to the invention may comprise two or more filaments.

In making a cable according to the invention, the individual filaments 11,12,13 are first imparted with substantially identical helical shapes and nested together as described above. Next the filaments are twisted together, such that the cable 10 has a lay length L that is at least two times and preferably two and one-half times, greater than the pitch length P of the helixes formed by the filaments. For example, if the filaments have diameters of 0.25 mm, the preferred pitch length of the helixes is 14 mm and the preferred lay length of the cable is 37 mm. As used herein, "lay length" is the axial distance required for a filament to make one 360 degree revolution in the cable.

Put another way, in a preferred embodiment of the invention the cable comprises three filaments of 0.25 mm diameter metallic wire formed into helixes with a pitch length of 14 mm and twisted 180 degrees about each other every 37 mm, so that each filament is twisted the entire 360 degrees every 37 mm. The ratio of pitch length to lay length is critical because if it is too small the filaments will be held together too tightly and an elastomeric material cannot be disposed all around the individual filaments.

The direction of the helixes of the filaments and the direction of twist of the cable is preferably the same, but it does not matter for the purpose of making a cable according to the invention whether this direction is left hand or right hand. As used herein, the direction of twist, lay, or a helix, refers to the direction of slope of the spirals of a filament or cable when the cable is held vertically. If the slope of the spirals conform in direction to the slope of the letter "S", then the direction is called "S" or "left hand". If the slope of the spirals conform to the slope of the letter "Z", then the direction is called "Z" or "right hand".

FIGS. 2 to 6 are cross-sectional views taken along lines 2—2 to 6—6 respectively of FIG. 1. The open structure of a cable made in accordance with the invention may be seen in these cross-sectional views.

Thorough coating of the filaments with an elastomeric material not only helps to restrict the spread of corrosion but also contributes to the filament's resistance to wear against one another, and restricts the amount of heat generated when the cable is subjected to bending loads. For example, these advantages may be realized by using the cable to reinforce an elastomeric article such as a pneumatic tire, belt, or hose.

Figure 7:
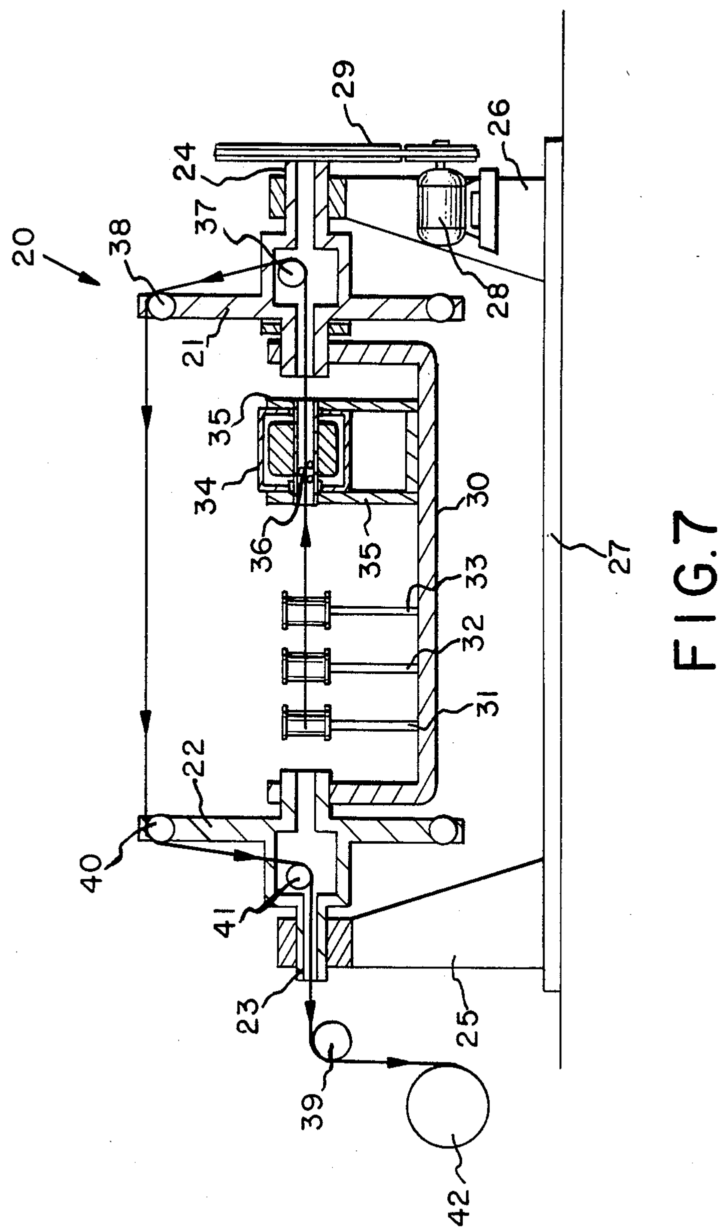
FIG. 7 is a side elevation view of an apparatus in accordance with the invention.

Referring now to FIG. 7, there is shown a side elevation view, partially in section, of an apparatus 20 for manufacturing a metallic cable with the structure illustrated in FIGS. 1–6. A first subassembly of the apparatus comprises first 21 and second 22 coaxial flyers spaced apart with respect to their axis of rotation. The flyers have hollow bearings 23,24 that are supported by a means for providing support such as stanchions 25,26 resting upon a base 27. A means for rotating the flyers about their axis is provided, such as an electric motor 28 and drive belt 29.

A second subassembly comprises a non-rotating cradle 30 suspended from the hollow bearings 23,24 of the flyers. A bobbin means 31,32,33 for supplying a plurality of metallic filaments is attached to the cradle. Spools that are freely rotatable about their axes are placed upon the bobbin means to supply metallic filaments. It is understood that while three spools are illustrated in the drawing, any number of spools may be used depending upon the number of filaments that the cable is desired to comprise. A rotatable means 34 for simultaneously deforming a plurality of metallic filaments and imparting a helical shape thereto is supportably attached to the cradle by a bearing post 35. Preferably, the means for deforming filaments comprises an electric motor with forming pins 36 attached inside of the hollow armature shaft of the motor. The forming pins, and of course the motor, are capable of rotating at a rate of between two and twenty times the rate of rotation of the flyers. The exact ratio of motor rotations to flyer rotations is dependent upon the desired ratio of the lay length of the cable to the pitch length of the helixes formed by the filaments. As an alternative to an electric motor with forming pins attached inside of its hollow shaft, the means for deforming the filaments into helixes could comprise a plurality of gear driven forming pins, with a power take off from the same electric motor that turns the flyers.

A first sunken rotating pulley 37 is located inside the hollow bearing 24 of the first flyer 21 guides a plurality of filaments through the hollow bearing of the first flyer in a direction that is parallel to, and preferably coincident with, the axis of the flyers. The first sunken rotating pulley also directs the filaments towards a flyer pulley 38 located at the outer periphery of the first flyer. If the means for helically deforming the filaments comprises the preferred electric motor and hollow shaft construction described above, the first sunken rotating pulley guides the filaments through the hollow shaft of the means for deforming as well as the hollow bearing of the first flyer.

A means for drawing the filaments from the bobbin means, such as a capstan 39 driven by a separate motor, draws the filaments through the means for deforming filaments 34 which deforms the parallel filaments into helixes, positioned beside and against each other such that each filament is in contact with at least one other filament. The pitch length of the helixes is determined by the speed of the means for drawing and the rotations per minute of the means for helically deforming filaments. The first sunken rotating pulley 37 then guides the filaments through the hollow bearing of the first flyer and redirects the filaments towards a flyer pulley 38 located at the circumferentially outer periphery of the first flyer. During the time between when the filaments are drawn around the first sunken rotating pulley and past the first 38 and second 40 flyer pulleys, the filaments are twisted together into a cable having a lay length that is at least two times, and preferably at least two and one-half times greater than the pitch length of the helixes formed by the filaments. The lay length of the cable is determined by the speed of the means for drawing and the revolutions per minute of the flyers. The cable is guided from the second flyer pulley 40 towards the axis of the flyers by a second sunken rotating pulley 41. The second sunken rotating pulley directs the cable through the hollow bearing 23 of the second flyer in a direction away from both of the flyers and parallel to, preferably coincident with, the axis of rotation of the flyers. The means for drawing 39 then directs the cable to a means for collecting a finished cable, such as a take-up spool 42.

While certain representative details and embodiments have been shown for the purpose of illustrating the invention, it will be apparent to those skilled in the art that various changes and modifications may be made therein without departing from the spirit or scope of the invention.

What is claimed is:

1. A metallic cable for reinforcing an elastomeric article comprising two or more substantially identical helically shaped metallic filaments positioned beside and against one other such that each filament is in contact with at least one other filament, the helixes formed by said filaments having a pitch length, and said filaments being twisted together such that said cable has a lay length that is at least two times greater than said pitch length.

2. A metallic cable according to claim 1 wherein said filaments have a diameter of between 0.20 mm and 0.30 mm.

3. A metallic cable according to claim 1 wherein said filaments have a diameter of 0.25 mm.

4. A metallic cable according to claim 2 wherein the pitch length of said helixes is between 10 mm and 18 mm.

5. A metallic cable according to claim 3 wherein the pitch length of said helixes is between 10 mm and 18 mm.

6. A metallic cable according to claim 3 wherein the pitch length of said helixes is 14 mm and the lay length of said cable is 37 mm.

7. An apparatus for manufacturing a metallic cable comprising:

(a) a first subassembly comprising first and second coaxial flyers spaced apart with respect to said axis, said flyers having hollow bearings that are supported by a means for providing support, and a means for rotating said flyers about said axis;

(b) a second subassembly comprising a non-rotating cradle suspended from the hollow bearings of said flyers, a bobbin means for supplying a plurality of metallic filaments attached to said cradle, a rotatable means for simultaneously deforming a plurality of metallic filaments and imparting a helical shape thereto is supportably attached to said cradle;

(c) a first sunken rotating pulley attached inside the hollow bearing of said first flyer for guiding a plurality of filaments through the hollow bearing of said first flyer in a direction that is parallel to the axis of said flyers and directing said filaments towards a flyer pulley located at the circumferentially outer periphery of said first flyer;

(d) a second sunken rotating pulley attached inside the hollow bearing of said second flyer for guiding a cable from a flyer pulley located at the circumferentially outer periphery of said second flyer towards the axis of said flyers and directing said cable in a direction away from both of said flyers and parallel to the axis of said flyers; and (e) a means for drawing filaments from said bobbin means, through said means for deforming filaments, around said first sunken rotating pulley, past said first and second flyers, around said second sunken rotating pulley, and to a means for collecting a finished cable.

8. An apparatus for manufacturing a metallic cable according to claim 7 wherein said means for deforming filaments rotates at between two and twenty times the rotations per minute of said flyers.

9. An apparatus for manufacturing a metallic cable according to claim 7 wherein said means for deforming filaments comprises an electric motor having a hollow armature shaft with forming pins attached to the inside of the hollow armature shaft.

10. An apparatus for manufacturing a metallic cable according to claim 8 wherein said means for deforming filaments comprises an electric motor having a hollow armature shaft with forming pins attached to the inside of the hollow armature shaft.

* * * * *